Figure 3:
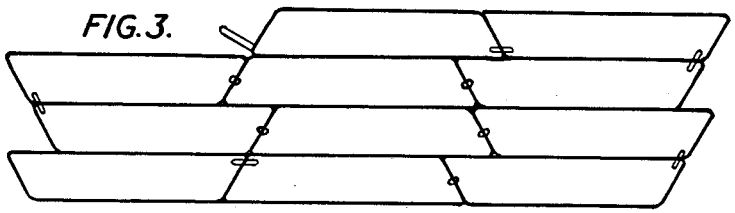

Nov. 1, 1955     C. G. GUTHRIE     2,722,295
METAL HATCH COVERS
Filed Sept. 4, 1951     5 Sheets-Sheet 1
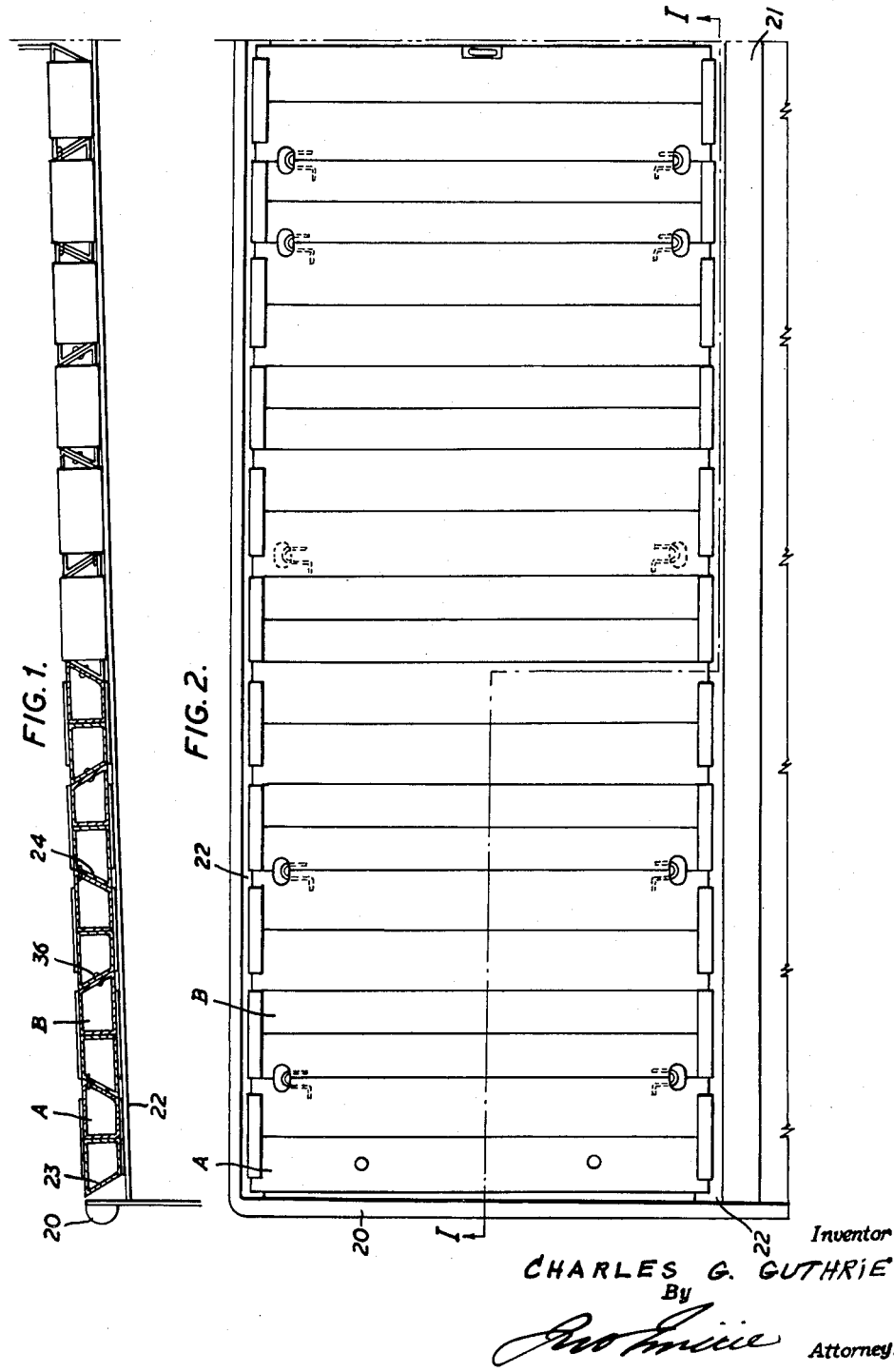
Inventor
CHARLES G. GUTHRIE
By
         Attorney Nov. 1, 1955 C. G. GUTHRIE 2,722,295
METAL HATCH COVERS
Filed Sept. 4, 1951 5 Sheets-Sheet 2

Inventor
CHARLES G. GUTHRIE
By
Attorney

Nov. 1, 1955 — C. G. GUTHRIE — 2,722,295
METAL HATCH COVERS
Filed Sept. 4, 1951 — 5 Sheets-Sheet 3

Inventor
CHARLES G. GUTHRIE
By
Attorney

Nov. 1, 1955 C. G. GUTHRIE 2,722,295
METAL HATCH COVERS
Filed Sept. 4, 1951 5 Sheets-Sheet 4
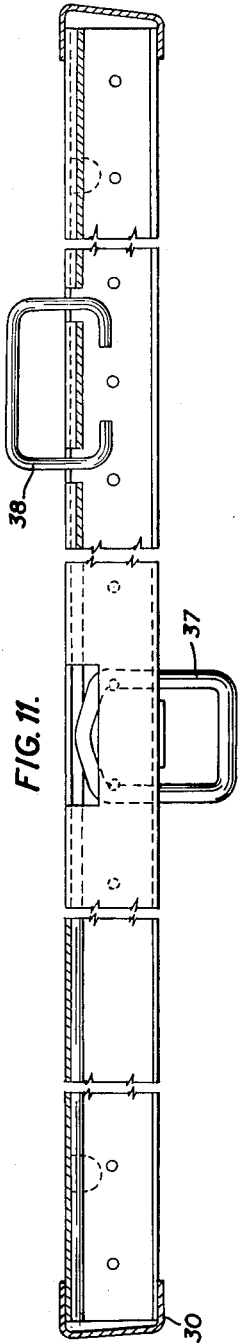
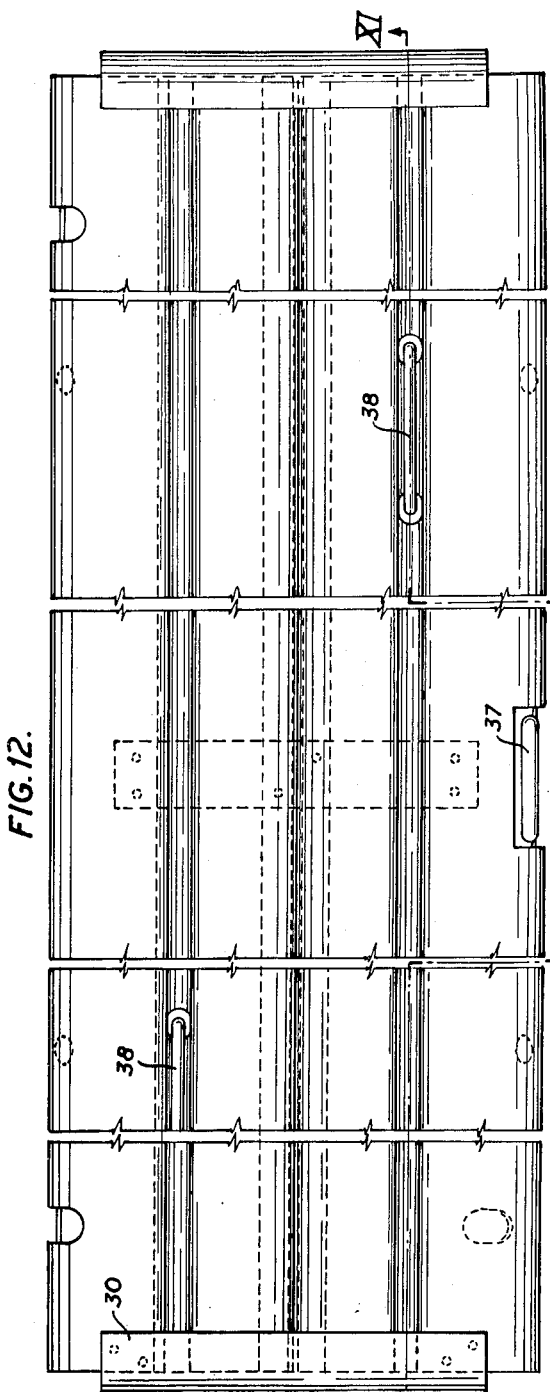
Inventor
CHARLES G. GUTHRIE
By
Attorney Nov. 1, 1955   C. G. GUTHRIE   2,722,295
METAL HATCH COVERS Filed Sept. 4, 1951   5 Sheets-Sheet 5

Inventor
CHARLES G. GUTHRIE
By
*Jno Smiie* Attorney

United States Patent Office 2,722,295
Patented Nov. 1, 1955

2,722,295

METAL HATCH COVERS

Charles Guthrie Guthrie, Formby, England, assignor to M. E. P. Company Limited, Liverpool, England, a British company Application September 4, 1951, Serial No. 245,016

Claims priority, application Great Britain September 14, 1950

3 Claims. (Cl. 189—46)

This invention is for improvements in or relating to hatch covers such as are used for closing ships' holds and the like.

One object of the invention is to make available metal hatch covers which can readily be adapted to provide a complete hatch cover assembly capable of fitting neatly and accurately into a hatch coaming of any width. A further object of the invention is to provide a metal hatch cover which, whilst it is light in weight, has adequate strength for the purpose for which it is intended.

According to the present invention there is provided a metal hatch cover comprising at least two longitudinal sections secured together edge to edge to provide a complete cover. Conveniently one section is slightly less than a half-cover and the other section is slightly more than a half-cover. For example, one section may be six-and-a-half inches wide and the other may be seven inches wide. In building up a complete hatch cover assembly some of the six-and-a-half inch sections may be joined together, to provide covers thirteen inches wide, and some of the seven inch sections may be joined together to provide covers fourteen inches wide, whilst one or more six-and-a-half inch sections may be joined to one or more seven inch sections so as to provide a cover or covers thirteen-and-a-half inches wide. By an appropriate selection of cover widths, after the manner just described, a complete assembly can be built up which will fit neatly into a hatch coaming of any width. Adopting covers of the dimensions just given provides for a degree of accuracy and fitting up to the very small limit of half-an-inch.

According to a further feature of the present invention there is provided a hollow metal hatch cover, a wall or walls of which is or are thickened locally (e. g. formed with ribs) to increase the strength of the cover. For instance, when the cover has longitudinal corrugations or indentations in, say, its upper walls it is convenient to thicken the metal in the locality of the corrugations or indentations so as still further to increase the strength and rigidity of the cover. Preferably the covers according to the present invention are made by a process of extrusion and it is possible with such a process to thicken parts of the cover as just described. A particularly suitable material for the covers is an aluminum alloy.

Conveniently the covers are of box-like section, partly open at the bottom, and additional strength may be provided by securing webs and tie members within the covers. Preferably the cover sections and strengthening members are all riveted together.

The invention can be applied with advantage to covers of the interlocking or inter-engaging type and covers according to the invention are particularly suited for articulation together.

Figure 7:
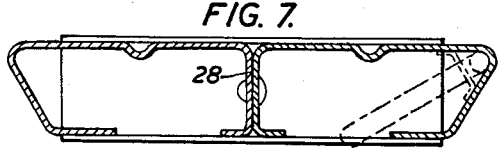
Figure 8:
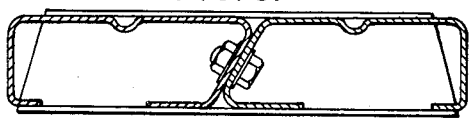
Figure 9:
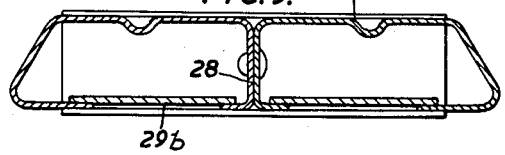
Figure 10:
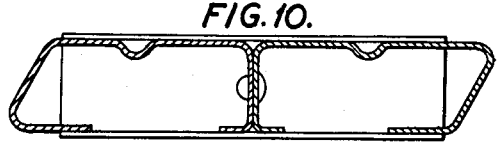
Figure 4:
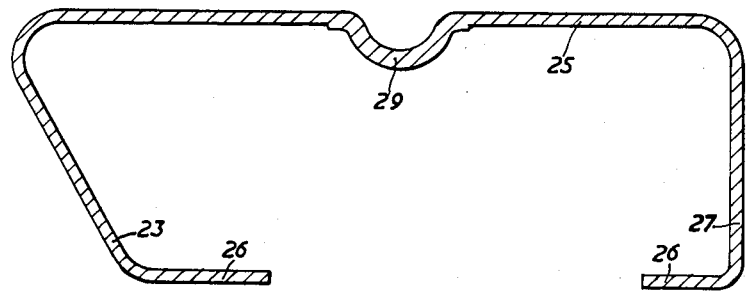
Figure 5:
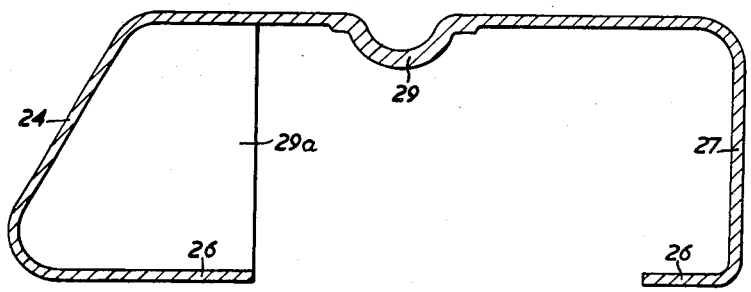
Figure 6:
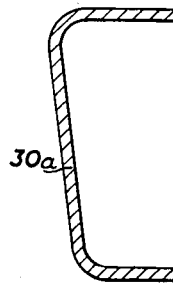
Figure 13:
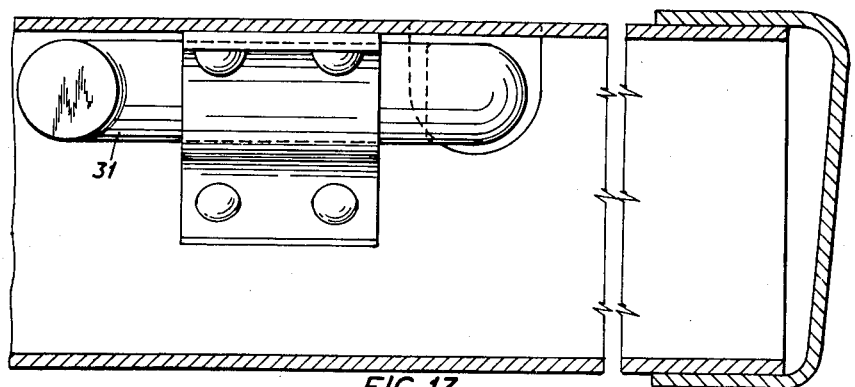
Figure 14:
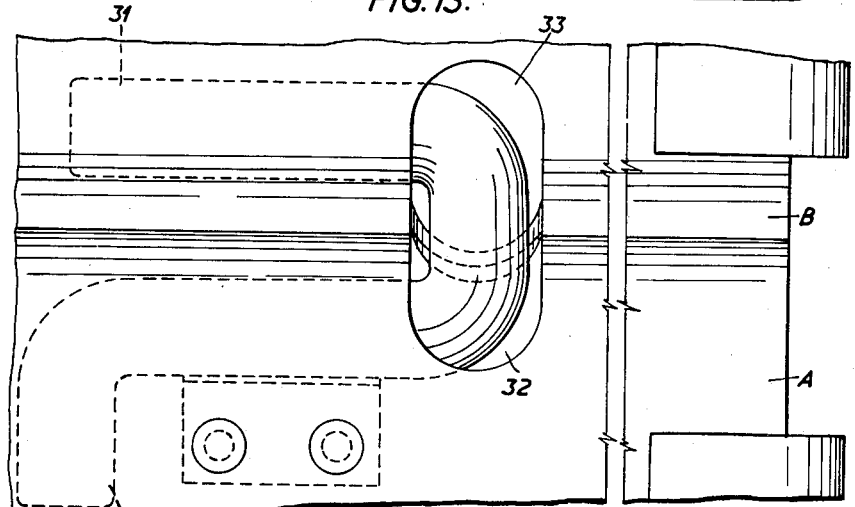
Figure 15:
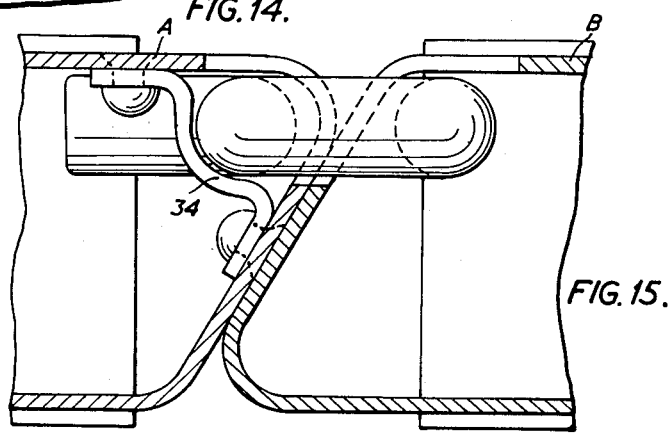

The invention will be further described, by way of example, and as applied to a ship's hatchway and hatch covers therefor with reference to the accompanying drawings, whereon:

Figure 1 is a semi-diagrammatic sectional view through one half of a hatchway the section being taken on line I—I of Figure 2, Figure 2 is a semi-diagrammatic plan view of the portion of a hatchway shown in Figure 1, Figure 3 is a diagrammatic view showing the manner in which the interlinked hatch covers illustrated in Figures 1 and 2 can be folded one upon another into a compact pile, Figure 4 is a cross section through one part of one of the covers, Figure 5 is a cross section through one part of another of the covers, Figure 6 is a cross section through an end closure plate for the covers, Figure 7 is a cross section through one complete cover, Figure 8 is a cross section through another form of complete cover, Figure 9 is a cross section through a still further form of the complete cover, Figure 10 is a cross section through a still further form of the complete cover, Figure 11 is a longitudinal sectional view of the cover shown in Figure 7 the section being taken on the line XI—XI of Figure 12, Figure 12 is a plan view of the cover shown in Figure 11, Figure 13 is a fragmentary sectional elevation and shows, more particularly, a means for articulating one of the covers to its neighbour, Figure 14 is a plan view of the articulating arrangement shown in Figure 13, and Figure 15 is a cross sectional view of the articulating arrangement shown in Figures 13 and 14.

The hatch shown in Figures 1 and 2 comprises the usual coaming 20 and hatch beams 21 which have landings or ledges 22 on which the hatch covers rest. In this particular embodiment of the invention the hatch covers are of the interlocking type and comprise, generally, what are hereinafter referred to as holding-down covers A and held-down covers B.

The A covers have their longitudinal side edges or walls 23 inclined downwardly and inwardly whilst the B covers have their longitudinal side edges or walls 24 inclined downwardly and outwardly. When the hatch covers are assembled in position, so as to close the hatchway, the longitudinal edges of the A covers overlie the longitudinal edges of the B covers and hold the latter down, the A covers interlocking if desired with holding-down devices (not shown) on the hatch beams.

In accordance with the present invention both the A and the B covers are made in two longitudinal parts, or "Halves." The cross section of the parts for the A covers is shown in Figure 4 and the cross section of the parts for the B covers is shown in Figure 5. These parts are formed by a process of extrusion, the metal used being preferably an aluminum alloy. The two parts of each cover may be equal in width or one may be slightly wider (e. g. half an inch wider) than the other. Each part is of box-like form closed at the top 25 and longitudinal side edges and having longitudinal inturned flanges 26 on its underside. One longitudinal side edge 27 of each part is vertical or square with the top 25 and bottom flanges 26 whilst the other longitudinal edge 23 or 24 is inclined downwardly and inwardly or outwardly according to whether it is a part for a B cover or an A cover.

To make up a complete cover two of the above described parts are riveted or bolted together with their vertical longitudinal side edges or walls 27 abutting. An A cover constructed in this way is shown in Figures 7, 11 and 12 and a section through a B cover is shown in Figure 9. This construction results in a web or rib 28 extending approximately centrally right down the length of the cover and having a thickness equal to twice that of the walls of the cover. This rib or web adds very materially to the strength of the cover. Additional strength is provided by forming, in the upper wall of each cover part a corrugation, rib or longitudinal indentation 29 which extends the full length of the part and the metal is preferably thickened in the vicinity of this corrugation as shown in Figures 4 and 5. To provide still further strength, vertical webs 29a (see Figure 5) may be secured between the top or upper wall 25 and at least the edge of the outermost of the inturned flanges 26. Furthermore when the cover parts are assembled to form a complete cover, tie plates 29b (see Figure 9) may be riveted to, and extend between, the outermost inturned flanges 26 on the lower part of the cover. The abutting innermost walls 27 (by which the cover parts are secured together) may be slightly shorter than the outermost longitudinal walls or edges 23 or 24 of the cover so that the tie plates may, if desired, pass neatly under the abutting side walls 27, the tie plates, in this case being continuous from one side flange to the other.

For some purposes the cover parts shown in Figures 4 and 5 may be secured together to provide a cover of rectangular or parallelogram cross section as shown in Figures 8 and 10 respectively.

It will be noted that for the extrusion process only two dies one slightly wider than the other are required for the A covers and similarly only two dies are required for the B covers. With this simple and inexpensive combination of dies, cover assemblies can be built up to suit any width of hatchway. As the sections are extruded they are sheared-off to the required length.

The ends of the individual parts or sections or of each completed cover may be closed by riveted-on end plates 30 of channel section, one of which is shown in detail in Figure 6.

For some purposes, it is preferable to bolt or rivet two, three or more covers together so as to form a unit or slab as shown in Figure 1, the bolts being indicated at 36. In this case the ends of the two, three or more covers may be closed by a common channel-section member into which said ends fit. If it is desired that the slabs should be a close or snug fit in the hatch coaming or hatchway then spacing bars or washers may be located on the bolts and between neighbouring covers so as to adjust the size of the slabs to give the required close or snug fit. The channel-section members are riveted or welded to the covers and serve not only to close the ends thereof but also to secure the covers together to form the aforementioned slab. Conveniently the webs 30a of the channel-section members 30 are slightly out of the vertical, i. e., they taper downwardly and slightly inwardly when fitted on the ends of the covers. This provides a "lead-in" to assist fitting of the covers and, provided the vertical web of the hatch or bridle beams is of less height than the depth of the covers, enables, for example, a cover five feet long to be fitted between hatch beams which are only just, or are very slightly under, five feet apart.

The articulating arrangement shown in Figures 13, 14 and 15 comprises a U-shaped or hairpin-like member 31 one limb of which is "hooked" through or engaged in an aperture 32 in the cover A and the other of which is "hooked" through or engaged in an aperture 33 in the cover B. The U-shaped member is held in position by a keep plate 34 secured within the cover A (or B) and a bent-over end 35 of the U-shaped member facilitates folding of the covers one upon another as shown in Figure 3. This articulating arrangement enables the covers to be folded flat one upon another when removed from the hatchway the whole assembly of hatch covers being lifted off the hatch coaming and replaced at one and the same time. As an alternative to hinging or articulating covers individually one to another the units, formed by securing together two or more covers by bolts 36 as shown in Figure 1, may be articulated together by the U-shaped members 31 as shown in Figure 2.

The covers of some of them may be provided with sling hooks or rings 37 and with drop handles 38 as indicated in Figure 11.

The invention is not, of course, confined to covers having bevelled side edges. Furthermore the invention can be applied to covers which are not of metal. For example, the covers may be made of one of the many suitable plastics now available.

I claim:

1. In a hatch of the kind having hatch covers the sides of some of which overlie the sides of others so as to lock the latter in position, a hatch cover comprising two open-ended longitudinally extending side-by-side parts each of similar trapezoidal cross-section, the parallel walls of said parts forming the top and bottom of the cover, means securing one of the non-parallel sides of one of said parts to one of the non-parallel sides of the other part, channel section end walls and means securing said channel section end walls to the ends of said longitudinal extending parts.

2. In a hatch of the kind having hatch covers the sides of some of which overlie the sides of others so as to lock the latter in position, a hatch cover comprising two open-ended longitudinal extending side-by-side parts of similar trapezoidal cross-section, the parallel walls of said parts forming the top and bottom of the cover, means securing one of the non-parallel sides of one of said parts to one of the non-parallel sides of the other, channel section end walls and means securing said channel section end walls to the ends of said longitudinal extending parts, one of the latter having a width slightly different to the width of the other.

3. A hatch cover as claimed in claim 1 wherein the webs of the channel section end walls taper downwardly and inwardly.

References Cited in the file of this patent

UNITED STATES PATENTS

| 968,321 | Boyer | Aug. 23, 1910 |
| 1,777,880 | Ewertz | Oct. 7, 1930 |
| 1,786,822 | Carr | Dec. 30, 1930 |
| 2,101,056 | Frick | Dec. 7, 1937 |
| 2,146,180 | Frick | Feb. 7, 1939 |
| 2,457,129 | Collings | Dec. 28, 1948 |
| 2,582,436 | Jernstrom | Jan. 15, 1952 |

FOREIGN PATENTS

| 490,425 | Great Britain | Aug. 12, 1938 |